(12) United States Patent
Joubert et al.

(10) Patent No.: US 6,391,951 B1
(45) Date of Patent: May 21, 2002

(54) PROPYLENE PENTENE-1 COPOLYMERS, METHOD OF PREPARATION THEREOF AND COMPOSITION CONTAINING THEM

(75) Inventors: Dawid Johannes Joubert, Sasolburg; Antonie Hermanus Potgieter, Secunda; Ignatius Hendrik Potgieter, Vanderbijlpark; Ioan Tincul, Sasolburg, all of (ZA)

(73) Assignee: Sasol Technology (Proprietary) Limited, Pretoria (ZA)

( * ) Notice: Subject to any disclaimer, the term of this patent is extended or adjusted under 35 U.S.C. 154(b) by 0 days.

(21) Appl. No.: 09/615,249

(22) Filed: Jul. 13, 2000

Related U.S. Application Data

(62) Division of application No. 08/875,782, filed as application No. PCT/GB96/00201 on Jan. 30, 1996, now Pat. No. 6,111,047.

(30) Foreign Application Priority Data

Feb. 9, 1995 (ZA) ............................................... 95/1057

(51) Int. Cl.$^7$ ......................... C08K 5/49; C08K 25/02; C08F 210/04
(52) U.S. Cl. ...................... 524/128; 524/333; 524/343; 524/348; 524/404; 524/579; 526/348.6
(58) Field of Search ........................... 526/124.3, 125.6, 526/348.6, 154; 524/128, 323, 330, 333, 342, 343, 348, 394, 399, 400, 579

(56) References Cited

U.S. PATENT DOCUMENTS 3,859,386 A   1/1975   Mainfo ...................... 260/878
3,974,236 A   8/1976   Koga et al.
4,367,322 A * 1/1983   Shiga et al. ................. 526/137

FOREIGN PATENT DOCUMENTS

| | | |
|---|---|---|
| DE | 4316049 | 12/1993 |
| EP | 0276323 | 8/1988 |
| EP | 0369213 | 5/1990 |
| EP | 0541273 | 5/1993 |
| EP | 0567117 | 10/1993 |
| EP | 0303894 | 2/1994 |
| EP | 0597119 | 5/1994 |
| EP | 0630916 | 12/1994 |
| GB | 1154544 | 6/1969 |
| JP | 2072311 | 6/1990 |
| ZA | 735653 | 8/1973 |
| ZA | 832654 | 3/1983 |
| ZA | 908694 | 10/1990 |
| ZA | 908695 | 10/1990 |

* cited by examiner

Primary Examiner—David W. Wu
Assistant Examiner—R. Harlan
(74) Attorney, Agent, or Firm—Ladas & Parry

(57) ABSTRACT

The invention provides a copolymer of propylene and pentene, together with a process for producing such copolymer and a polymer composition. In the process, propylene and pentene are reacted in a reaction zone at a pressure of 60 kg/cm$^2$ and temperature of 0–100° C. for 20–480 minutes in the presence of a Ziegler-Natta catalyst or catalyst system. The polymer composition has several components, namely the above copolymer, a phenolic stabilizer, an organic phosphite stabilizer, a thioether stabilizer and at least one metal salt of a higher aliphatic acid, with the proviso that at least one of the organic phosphite stabilizer, the thioether stabilizer and said salt must be present, so that up to two thereof can optionally be omitted.

8 Claims, No Drawings

PROPYLENE PENTENE-1 COPOLYMERS, METHOD OF PREPARATION THEREOF AND COMPOSITION CONTAINING THEM

This application is a divisional of application Ser. No. 08/875,782 filed on Oct. 28, 1997, now U.S. Pat. No. 6,111,047 which is International Application PCT/GB96/00201 filed on Jan. 30, 1996 and which designated the U.S., claims the benefit thereof and incorporates the same by reference.

THIS INVENTION relates to copolymerization. It relates in particular to a copolymer of propylene and 1-pentene, to a process for producing such a copolymer, and to a polymer composition which includes such a copolymer.

According to a first aspect of the invention, there is provided, broadly, a copolymer of propylene and 1-pentene.

The copolymer may, more particularly, have a random arrangement of propylene and 1-pentene, ie it may be a random copolymer of propylene and 1-pentene. The copolymer may be thermoplastic, and may have crystalline and amorphous sequences.

The copolymer may further be characterized by the substantial absence of monomer sequences other than propylene and 1-pentene.

About 0.05% to 20% by mass of the copolymer may be derived from 1-pentene, with the balance thus being derived from propylene.

The melt flow index of the copolymer may be in the range of about 0.01 to about 200 g/10 minutes, preferably in the range 0.5 to about 60 g/10 minutes.

The copolymer may comply with the formula $$IS > 0.5Y + 5$$

where IS is the impact strength thereof, expressed in $Kj/m^2$, and Y is the weight percent of 1-pentene in the copolymer. The copolymer may also have a haze value lower than 7.5% when measured according to ASTM 1003-92, on a film of 100 $\mu$m.

The copolymer may be that obtained by reacting propylene and 1-pentene in a reaction zone, while maintaining a pressure between 1 and 60 $kg/cm^2$ in the zone, at a reaction temperature between 0° C. and 100° C., and for a reaction time between 20 minutes and 8 hours, in the presence of a suitable Ziegler-Natta catalyst or catalyst system. Still more particularly, the copolymer may be that obtained by continuously varying, during the reaction of the propylene and the 1-pentene, the ratio of the concentration of the propylene to that of the 1-pentene.

Thus, according to a second aspect of the invention, there is provided a process for producing a copolymer, which process comprises reacting propylene and 1-pentene in a reaction zone, while maintaining a pressure between 1 and 60 $kg/cm^2$ in the zone, at a reaction temperature between 0° C. and 100° C., and for a reaction time between 20 minutes and 8 hours, in the presence of a suitable Ziegler-Natta catalyst or catalyst system.

The process may include continuously varying the ratio of the concentration of the propylene to that of the 1-pentene in the reaction zone, so that the copolymer has a random arrangement of propylene and 1-pentene. In other words, the copolymer is then a random copolymer of propylene and 1-pentene, which can also be referred to as 'n-pentene-1'.

While the reaction temperature can be in the range of 0° C. to 100° C. as stated hereinbefore, it is preferably in the range of 20° C.–80° C., still more preferably in the range 40° C.–70° C.

Since propylene is a gas at atmospheric pressure, the reaction zone is thus provided by a closed reaction vessel, with the zone pressure being in said range of 1–60 $kg/cm^2$. Preferably, the pressure is in the range 3–30 $kg/cm^2$, more preferably in the range 6–14 $kg/cm^2$.

The reaction will thus be continued for a sufficient period of time to obtain a desired degree of conversion of the monomers. Typically, the conversion can be in the range 10%–95%. Thus, the reaction time will normally be between said 20 minutes and 8 hours, preferably between 40 minutes and 2 hours.

The reaction is preferably carried out in a single reaction zone, ie a single stage reactor vessel is preferably used. The reaction can be effected in a batch fashion, with all the monomers, ie the propylene and 1-pentene, being added simultaneously at the start of the reaction to the reaction zone, and no product being removed therefrom during the course of the reaction. Thus, the continuous variation in the ratio of the concentration of the propylene to that of the 1-pentene during the reaction is achieved by virtue of the monomers being consumed at unequal rates during the reaction, ie the monomers have different reaction rates. Instead, the process may be a semi-continuous process, wherein at least one of the monomers is added continuously to the reaction zone over a period of time with the other monomer then either also being added continuously over the period of time or being added at the start of the reaction, and with no products being removed. The continuous variation in the relative concentrations of the monomers is then achieved through the unequal rates of consumption of the monomers during the reaction, as well as rates of addition of the monomers. In yet a further embodiment, the process may be a continuous process, involving the continuous addition of the monomers to the reaction zone, and the continuous removal of products therefrom. In such case, the continuous variation in the relative concentrations of the monomers is effected by means of the unequal rates of consumption thereof, as well as by the addition rates of the monomers and the withdrawal rate of product from the reaction zone.

The reaction is preferably also carried out in slurry phase. Accordingly, the monomers and/or the catalyst may be suspended in a suitable inert slurrying agent. The slurrying agent may be a saturated, aliphatic or cyclo-aliphatic liquid hydrocarbon. In particular the hydrocarbon may have from 2–12 carbon atoms. Most preferred are aliphatic hydrocarbons having 6 and 7 carbon atoms. The volume or proportion of slurrying agent used is not critical, but should be sufficient to permit good agitation of the resultant slurry, and efficient heat transfer. Thus, sufficient slurrying agent may be used to achieve a slurry concentration in the range of 4 g–400 g of polymer per liter of slurrying agent, preferably 50–250 g/l.

The molecular weight of the resultant random copolymer can be regulated by adding hydrogen to the reaction zone. The greater the amount of hydrogen added, the lower will be the molecular weight of the random copolymer. A hydrogen partial pressure of 0.1–2 $kg/cm^2$ is suitable for a reaction zone pressure of 3–30 $kg/cm^2$.

Any Ziegler-Natta catalyst or catalyst system, suitable for propylene polymerization, can, at least in principle, be used. Thus, a catalyst system comprising a titanium-based Ziegler-Natta catalyst and, as a co-catalyst, an organo-aluminium compound, and wherein the atomic ratio of aluminium to titanium in the catalyst system is between 0.1:1 and 100:1, preferably 0.65:1 and 65:1, may be used.

Sufficient of the titanium-based Ziegler-Natta catalyst should then be used such that the concentration of titanium is at least 0.0001 mole %, based on the total monomer addition to the reaction zone. Preferably, the concentration thereof should be in the range 0.0003–0.15 mole % titanium.

Typical titanium components of the Ziegler-Natta catalyst are titanium trichlorides of α, β, γ and δ type, and titanium trichlorides or titanium tetrachloride carried on a support. Catalyst support and activation can be effected in known fashion. For the preparation of a titanium catalyst, halides or alcoholates of trivalent or tetravalent titanium are normally used. $TiCl_4$ is especially preferred.

In addition to the trivalent and tetravalent titanium compounds and the support or carrier, the catalyst can also contain electron-donor compounds, e.g. mono or poly functional carboxyl acids, carboxyl anhydrides and esters, ketones, ethers, alcohols, lactones, or phosphorous or silicon organic compounds. Electron-donor compounds improve activity, stereoregularity and granulometric properties of the catalyst.

A preferred titanium-based catalyst is $(TiCl_3)_3$ $AlCl_3$ commercially available with a content of 76.5–78.5 $TiCl_3$ weight percent. Another preferred titanium catalyst is δ-$TiCl_3$ $(AlCl_3)_{1/3}$ (n-propyl benzoate), which is commercially available.

Typical organo aluminium compounds which can be used in combination with the titanium-based catalyst are compounds expressed by the formula Al $R_m$ $X_{3-m}$ wherein R is hydrogen or a hydrocarbon residue of 1–15 carbon atoms, X is a halogen atom or an alkoxy group of 1–15 carbon atoms, and m is a number represented by 0<m<3. Specific examples of suitable organo aluminium compounds which can be used are: a trialkyl aluminium, a trialkenyl aluminium, a partially alkoxylated alkyl aluminium, an alkyl aluminium sesquialcoxide, a partially halogenated alkyl aluminium, an alkyl aluminium sesquihalide, an alkyl aluminium dihalide, a partially hydrogenated alkyl alumina, an alkyl aluminium dihydride, and an alkyl aluminium oxyhalide. The most preferred organo aluminium compound is diethylaluminium chloride. Triethyl aluminium is the most preferred compound when working with magnesium chloride supported titanium catalyst in the presence of an electron donor.

The copolymer obtained from the process shows a random monomer distribution controlled by the ratio of the monomers used, and the reaction conditions. Thus, in the copolymer, the portion attributed to propylene can be in the range of 80–99.95% by weight, based on the weight of the copolymer, preferably in the range of 94%–99%. In other words, the portion attributed to 1-pentene can be in the range of 0.05%–20% by weight, preferably in the range of 1–6% by weight, as stated hereinbefore.

The Applicant is aware that polypropylene copolymers are sensitive to oxidation and normally are not used without adequate stabilization. The copolymers according to this invention can thus be stabilized in the same fashion as for the propylene copolymer stabilization.

An improved stabilization system for stabilization of copolymers according to the invention, thereby decreasing their termooxidative degradation and improving their long term heat stability is, however, also provided.

Thus, according to a third aspect of the invention, there is provided a polymer composition, which comprises as component (i), a copolymer of propylene and 1-pentene;

as component (ii), at least one phenolic stabilizer; and as component (iii), at least one organic phosphite stabilizer; and/or as component (iv), at least one thioether stabilizer; and/or as component (v), at least one metal salt of a higher aliphatic acid, with the proviso that at least one of components (iii), (iv) and (v) is present.

The copolymer of propylene and 1-pentene may thus be as hereinbefore described.

Component (ii) may comprise an organic phenolic stabilizer having a molecular mass exceeding 300 and/or a monomeric phenolic stabilizer.

A large range of known phenolic compounds can be used as the organic phenolic stabilizer or antioxidant. These include alkylphenols, hydroxyphenylpropionates, hydroxybenzyl compounds, and alkylidene bisphenols. As mentioned, the preferred phenolic stabilizers are those with molecular mass greater than 300. The most preferred phenolic stabilizers are those with a molecular mass greater than 600. Examples of preferred stabilizers are tetrakis methylene(3,5-di-t-butyl-4-hydroxyhydrocinnamate)methane octadecyl-3-(3,5-di-t-butyl-4-hydroxyphenyl)propionate 1,3,5-tris(3',5'-di-t-butyl-4'hydroxybenzyl)-s-triazine-2,4,6-(1H,3H,5H)trione 2,2'thiodiethyl-bis-(3,5-di-t-butyl-4-hydroxyphenyl)propionate A monomeric phenolic stabilizer is a dual functional compound having an antioxidant function and also being capable of polymerization, ie having a polymerizable group. It can be incorporated in the copolymer by a physical method, e.g. by melt mixing it with the copolymer or by mixing the copolymer with the homopolymer of the monomeric phenolic stabilizer or antioxidant. It can, however, also be incorporated in the copolymer by copolymerization. The preferred method of incorporation of the monomeric phenolic stabilizer is by graft copolymerization with the copolymer, initiated by radical initiators and/or by mechanical shearing in a molten state. The preferred radical initiators are peroxides. Examples of classes of peroxides which can be used are diacyl peroxides, dialkyl peroxidicarbonates, peresters, alkyl hydroperoxides, and dialkyl peroxides. The most preferred peroxide is the dicumyl peroxide.

More particularly, the monomeric phenolic stabilizer has, in addition to the polymerizable group, a hindered phenolic group providing the antioxidant function. Preferred monomeric phenolic stabilizers are those having a 3,5-bis(1,1-dimethylethyl)-4-hydroxyphenyl group providing the antioxidant function, attached to a vinyl polymerizable group. Examples of such monomeric phenolic stabilizers are 2,6-bis(1,1-dimethylethyl)-4-(1-methylethenyl)phenol 2,6-bis(1,1-dimethylethyl)-4-(4-pentenyl)phenol 2,6-bis(1,1-dimethylethyl)-4-(3,3-dimethyl-1-butenyl)phenol 2,6-bis(1,1,-dimethylethyl)-4-(2-propenyl)phenol The most preferred monomeric phenolic stabilizer is 2,6-bis(1,1-dimethylethyl)-4-(ethenyl)-phenol.

A monomeric phenolic stabilizer grafted onto the copolymer chain inhibits the loss of the antioxidant during processing through volatility, migration or extraction with solvents. The use of a mixture of an organic phenolic stabilizer and a monomeric phenolic stabilizer grafted onto the copolymer is an exceptional combination which brings about particularly beneficial short and long term stabilization effects.

The composition can thus additionally include component (iii). While, at least in principle, any organic phosphite stabilizer can be used, it preferably has a molecular mass in excess of 300. Examples of such organic phosphite stabilizers are:

tris(2,4-di-t-butylphenyl)phosphite tris(4-nonylphenyl)phosphite tetrakis(2,4-di-t-butylphenyl)-4,4'-diphenylenebisphosphonite bis(2,4-di-t-butylphenyl)pentaerythritoldiphosphite The use of an organic phosphite stabilizer together with a phenolic antioxidant and especially with a mixture of an organic phenolic antioxidant and a monomeric phenolic antioxidant grafted onto the copolymer chain increases the stability of the propylene/1-pentene copolymer to thermooxidative degradation, and provides particularly good long term heat stability.

The composition may instead, or additionally, include component (iv). The thioether stabilizer of component (iv) may be selected from the group consisting in dilauryl thiodipropionate, distearyl thiodipropionate, dimyristyl thiodipropionate, and dioctadecyl disulphide.

The presence of such a thioether stabilizer increases the stabilization properties of the phenolic stabilizer or antioxidant. The use of a thioether stabilizer with a mixture of an organic phenolic antioxidant and a monomeric phenolic antioxidant grafted onto the copolymer chain confers excellent degradation stability to the propylene/1-pentene copolymer.

The composition may instead, or additionally, include component (v). The metal salt of component (v) may be an alkaline earth metal salt, such as a magnesium salt, a calcium salt, or a barium salt; an alkali metal salt; a zinc salt; a cadmium salt; or a lead salt of a higher aliphatic acid such as stearic acid, lauric acid, capric acid or palmitic acid. The most preferred metal salt is calcium stearate.

When a higher aliphatic acid metal salt is added to a propylene-1-pentene copolymer or a propylene/1-pentene copolymer composition according to this invention, the metal salt is capable of sufficiently absorbing residual chloride originating from the catalyst used to produce the copolymer.

In one embodiment of the invention, the polymer composition may comprise

| | |
|---|---|
| component (i) | about 100 parts by mass |
| component (ii) | 0.01–1 part by mass, preferably 0.03–0.3 part |
| component (v) | 0.01–3 parts by mass, preferably 0.05–1 part |

In another embodiment of the invention, the polymer composition may comprise

| | |
|---|---|
| component (i) | about 100 parts by mass |
| component (ii) | 0.01–1 part by mass, preferably 0.03–0.3 part |
| component (iii) | 0.01–1 part by mass, preferably 0.03–0.3 part |
| component (v) | 0.01–3 parts by mass, preferably 0.05–1 part |

In yet another embodiment of the invention, the polymer composition may comprise

| | |
|---|---|
| component (i) | about 100 parts by mass |
| component (ii) | 0.01–1 part by mass, preferably 0.03–0.3 part |
| component (iv) | 0.01–3 parts by mass, preferably 0.03–0.9 part |
| component (v) | 0.01–3 parts by mass, preferably 0.05–1 part |

In these embodiments, the ratio of the organic phenolic stabilizer to the monomeric phenolic stabilizer can be varied over the entire range possible, ie from 100% of organic phenolic stabilizer and no monomeric phenolic stabilizer to 100% of monomeric phenolic stabilizer and no organic phenolic stabilizer.

Additionally, the composition may include other antioxidants, light stabilizers, antistatic agents, antiblocking agents, slip agents, nucleating agents, inorganic and organic fillers, inorganic and organic pigments, blended with the propylene/1-pentene copolymers.

The invention will now be described by way of the following non-limiting examples.

EXAMPLE 1

1490 g of highly purified and dried n-heptane was introduced into a 5 l. stainless steel polymerization vessel provided with an agitator driven by an electric motor. After severe purging of the vessel with nitrogen, 2.5 g of diethylaluminium chloride ('DEAC') and 0.785 g titanium trichloride catalyst (titanium trichloride AA type C manufactured by Akzo Nobel) were introduced into the vessel, with the n-heptane thus acting as inert slurrying agent for the catalysts. The process temperature was set at 60° C., and the mixture stirred for 45 minutes. Thereafter, 20 mg of hydrogen was supplied to the polymerization vessel, together with 20 g of 1-pentene.

Simultaneously with the introduction of the 1-pentene, continuous introduction of 600 g of propylene at a constant rate of 15 g/minute, was commenced. The pressure increased continuously to 15 bar over the 40 minute period of propylene addition. The slurry was further agitated for another 20 minutes.

In a next step, the polymerization vessel was depressurized and the catalyst decomposed in an excess of isopropanol. The resultant copolymer was then filtered and repeatedly washed with propanol, methanol and acetone. The copolymer was dried in a vacuum oven at 70° C. for 24 hours. The yield of the copolymer was 320 g.

The amount of 1-pentene incorporated in the copolymer was 1.24 weight percent. The melt flow index was 1.52; the tensile strength at yield was 32.14 MPa; the Izod notched impact resistance at 23° C. was 5.87 KJ/m$^2$, and the haze on pressed film of 100 microns was 1.5.

EXAMPLE 2

Copolymerization was carried out under the conditions specified in Example 1 except for the quantity of 1-pentene added, which was 4.8 g. The copolymer was obtained at a yield of 295 g. The measured properties of the copolymer are presented in Table 1.

EXAMPLE 3

Copolymerization was carried out by the procedure described in Example 1 except for the quantity of 1-pentene added, which was 80 g. The yield of the copolymer was 351 g. The measured properties of the copolymer are presented in Table 1.

EXAMPLE 4

Copolymerization was performed by the procedure of Example 1 except for the quantity of 1-pentene added, which was 40 g. 317 g of the copolymer were obtained. The measured properties of the copolymer are presented in Table 1.

EXAMPLE 5

Copolymerization was performed according to the conditions specified in Example 1, except for the quantity of 1-pentene added, which was 132 g. The yield of the copolymer was 650 g. The measured properties of the copolymer are presented in Table 1.

EXAMPLE 6

2.5 l of highly purified n-heptane was introduced into a 5 l stainless steel polymerization vessel provided with an agitator. After thorough purging of the vessel with nitrogen, 5 g of DEAC and 2 g of $TiC_3$ $(AlCl_3)⅓$ (n-propylbenzoate)⅓ catalyst was introduced into the vessel. The process temperature was set to 50° C., and the mixture was stirred for one hour under nitrogen. The pressure was increased to 1 $kg/cm^2$ with hydrogen, and 46.4 g of 1-pentene were introduced into the polymerization vessel. Simultaneously with the introduction of 1-pentene, the supply of propylene to the polymerization vessel was commenced. The pressure was raised to 6 $kg/cm^2$ with propylene addition, and the flow of propylene was adjusted to keep this pressure constant for 120 minutes. Thereafter, the supply of propylene was stopped and the polymerization vessel depressurized. The same procedure of catalyst deactivation, filtration and drying as described in Example 1 was performed. The yield of the copolymer was 753 g. The composition determination and the copolymer characterization was performed as in Example 1. The results are presented in Table 2.

EXAMPLE 7

The copolymerization was performed according to the conditions specified in Example 6, except for the quantity of the 1-pentene added, which was 39.7 g and the time for polymerization which was 240 minutes. The yield of the copolymer was 1010 g. The composition of the copolymer, and the measured properties are presented in Table 2.

EXAMPLE 8

The copolymerization was performed according to the conditions specified in Example 6, except for the quantity of the 1-pentene added, which was 45.5 g and the time of the polymerization which was 480 minutes. The yield of the copolymer was 1213 g. The composition of the copolymer and the measured properties are presented in Table 2.

EXAMPLE 9

The copolymerization was carried out under the conditions specified in Example 6, except for the amount of 1-pentene added, which-was 37.5 g and the fact that hydrogen was not used in this copolymerization. The yield was 620 g. The composition of the copolymer and the measurement of the properties are presented in Table 2.

EXAMPLE 10

The copolymerization was carried out under the conditions specified in Example 6, except for the following changes: no hydrogen was used; the amount of 1-pentene added was 96.9 g; the reaction temperature was 45° C.; the pressure was 7.9 $kg/cm^2$; the polymerization time was 60 minutes. The yield was 320 g. The composition of the copolymer and the measured properties are presented in Table 2.

TABLE 1

|  |  | Example 1 | Example 2 | Example 3 | Example 4 | Example 5 |
| --- | --- | --- | --- | --- | --- | --- |
| 1. 1-Pentene content | % weight | 1,24 | 0,3 | 6,0 | 2,8 | 14 |
| 2. Melt flow index | g/10 min | 1,52 | 0,80 | 1,10 | 1,61 | 52,3 |
| 3. Tensile strength at yield | MPa | 32,14 | 34,3 | 25,3 | 30,7 | 14,96 |
| 4. Izod notched impact | $KJ/m^2$ | 5,87 | 5,56 | 13,29 | 6,72 | — |
| 5. Haze | % | 1,5 | 3,7 | 7,2 | 2,4 | 2.6 |

TABLE 2

|  |  | Example 6 | Example 7 | Example 8 | Example 9 | Example 10 |
| --- | --- | --- | --- | --- | --- | --- |
| 1. 1-Pentene content | % weight | 2,2 | 1,8 | 1,3 | 3,0 | 2,4 |
| 2. Melt flow index | g/10 min | 26,9 | 20,4 | 16,1 | 0,01 | 0,01 |
| 3. Tensile strength at yield | MPa | 32,7 | 33,3 | 32,9 | 33,5 | 34,4 |
| 4. Izod notched impact | $KJ/m^2$ | — | — | — | 10,22 | 8,35 |
| 5. Haze | % | 3,0 | 3,2 | 4,2 | — | — |

EXAMPLE 11

33.33 g of the propylene/1-pentene copolymer obtained according to Example 1 was powder mixed with 0.05 g of tetrakis methylene (3,5-di-t-butyl-4-hydroxyhydrocinnamate)methane 0.1 g of bis(2,4-di-t-butyl)pentaerythritol diphosphite 0.1 g of calcium stearate 0.05 g of 2,6-bis(1,1-dimethylethyl)-4-ethenylphenol The powder mixture was further melt mixed in a Brabender (trade name) at 235° C. for 5 minutes together with 0.003 g dicumyl peroxide. From this blend a film of 0.2 mm was pressed between two aluminium foils using a hydraulic press equipped with a spacer template. The film was pressed at 180° C., for 4 minutes, under 4 tonnes pressure. The film was then placed in a Speccard (trade name) and exposed to oven ageing at 110° C. After 365 days of oven ageing no sign of brittleness was noticeable. The increase in carbonyl which developed due to oxidation was lower than 5%.

EXAMPLE 12

33.33 g of the propylene/1-pentene copolymer obtained according to Example 1 was powder mixed with 0.1 g of tetrakis methylene (3,5-di-t-butyl-4-hydroxyhydrocinnamate)methane 0.1 g of 2,6-bis(1,1-dimethylethyl)-4-ethenylphenol 0.1 g of calcium stearate The melt blending and oven exposure were performed as specified in Example 11. After 365 days of oven ageing no sign of brittleness was noticeable. The increase in carbonyl which developed due to oxidation was less than 5%.

EXAMPLE 13

33.33 g of the propylene/1-pentene copolymer obtained according to Example 1 was powder mixed with 0.1 g of bis(2,4-di-t-butylphenyl)pentaerythritoldiphosphite 0.1 g of 2,6-bis(1,1-dimethylethyl)-4-ethenylphenol 0.1 g of calcium stearate The melt blending and oven exposure were performed as specified in Example 11. After 365 days of oven ageing no sign of brittleness was noticeable. The increase in carbonyl which developed due to oxidation was lower than 5%.

EXAMPLE 14

33.33 g of the propylene/1-pentene copolymer obtained according to Example 1 was powder mixed with 0.15 g of distearylthiodipropionate 0.05 g of tetrakis methylene(3,5-di-t-butyl-4-hydroxyhydrocinnamate)methane 0.05 g of 2,6 bis(1,1,-dimethylethyl)-4-ethenylphenol 0.1 g of calcium stearate The melt blending and oven exposure were performed as specified in Example 11. After 365 days of oven ageing no sign of brittleness was noticeable. The increase in carbonyl which developed due to oxidation was less than 5%.

EXAMPLE 15

33.33 g of the propylene/1-pentene copolymer obtained according to Example 1 was used on its own, with no stabilizers added. The melt blending and oven exposure was performed as specified in Example 11. After 12 days local embrittlement was noticeable. The carbonyl which developed due to oxidation increased by 10 times the initial value.

EXAMPLE 16

33.33 g of the propylene/1-pentene copolymer obtained according to Example 2 was powder mixed with 0.05 g of tetrakis methylene (3,5-di-t-butyl-4-hydroxyhydrocinnamate)methane 0.1 g of bis(2,4-di-t-butyl-phenol)pentaerythritol diphosphite 0.1 g of calcium stearate 0.5 g of 2,6 bis(1,1-dimethylethyl)-4-ethenylphenol The melt blending and oven exposure were performed as specified in Example 11. After 365 days of oven ageing no sign of brittleness was noticeable. The increase in carbonyl which developed due to oxidation was less than 5%.

EXAMPLE 17

33.33 g of the propylene/1-pentene copolymer obtained according to Example 3 was powder mixed with 0.05 g of tetrakis methylene(3,5-di-t-butyl-4-hydroxyhydrocinnamate)methane 0.1 g of bis(2,4-di-t-butyl-phenyl)pentaerythritol diphosphite 0.1 g of calcium stearate 0.05 g of 2,4 bis(1,1-dimethylethyl)-4-ethenylphenol The melt blending and oven exposure were performed as specified in Example 11. After 220 days of oven ageing brittleness was noticed. The carbonyl developed due to oxidation increased sharply from 50% on day 210 to 260% on day 220.

EXAMPLE 18

33.33 g of the propylene/1-pentene copolymer obtained according to Example 4 was powder mixed with 0.05 g of tetrakis methylene(3,5-di-t-butyl-4-hydroxyhydrocinnamate)methane 0.1 g of bis(2,4-di-t-butyl-phenyl)pentaerythritol diphosphite 0.1 g of calcium stearate 0.05 g of 2,4 bis(2,6-dimethylethyl)-4-ethenylphenol The melt blending and oven exposure were performed as specified in Example 11. After 365 days of oven ageing no sign of brittleness was noticeable. The increase in carbonyl which developed due to oxidation was less than 40%.

EXAMPLE 19

33.33 g of the propylene/1-pentene copolymer obtained according to Example 7 was powder mixed with 0.05 g of tetrakis methylene(3,5-di-t-butyl-4-hydroxyhydrocinnamate)methane 0.1 g of bis(2,4-di-t-butyl-phenyl)pentaerythritol diphosphite 0.1 g of calcium stearate 0.05 g of 2,6 bis(1,1-dimethylethyl)-4-ethenylphenol The melt blending and oven exposure were performed as specified in Example 11. After 365 days of oven ageing no sign of brittleness was noticeable. The increase in carbonyl which developed due to oxidation was less than 20%.

EXAMPLE 20

3.33 g of the propylene/1-pentene copolymer obtained according to Example 2 was powder mixed with 0.05 g of tetrakis methylene(3,5-di-t-butyl-4-hydroxyhydrocinnamate)methane 0.1 g of bis(2,4-di-t-butyl-phenyl)pentaerythritol diphosphite 0.1 g of calcium stearate 0.05 g of 2,6 bis(1,1-dimethylethyl)-4-ethenylphenol The melt blending and oven exposure were performed as specified in Example 11, with the difference that the Brabender mixing was performed for 10 minutes instead of 5 minutes. After 365 days of oven ageing no sign of brittleness was noticeable. The increase in carbonyl which developed due to oxidation was less than 5%.

EXAMPLE 21

Method of preparation of 2,6-bis(1,1-dimethylethyl)-4-ethenylphenol used in the various examples.

3.5 g of boric acid was heated in 150 ml of ethylene glycol at 150° C. for 30 minutes, in a 500 cc flask equipped with a reflux condenser. 25 g of hexamethylenetetramine and 21 g of 2,6-bis (1,1-dimethylethyl)phenol were then added and the solution maintained at 148–150° C. for 15 minutes. After cooling to 125° C. at which stage the first crystals appeared, 150 ml of $H_2SO_4$ (30% 0 was added and stirring was continued for another 30 minutes. The resulting slurry was filtered and washed with warm water. After drying, 22 g of 3,5-bis (1,1-dimethylethyl)benzaldehyde was obtained.

47 g of malonic acid and 208.8 dioxan was introduced into a flask equipped with a reflux condenser and a deep tube. Gaseous $NH_3$ was bubbled through the deep tube until ammonium malonate formed. 60 g of 3,5-bis (1,1-dimethylethyl)benzaldehyde, obtained as above, was introduced and the mixture kept under reflux at 95–100° C. After the disappearance of the solid phase, 50% of the dioxane was distilled, and the solution cooled and poured into dilute HCl. After filtration, the resultant precipitate was washed with water, dissolved in a solution of HaOH 10%, and filtered. The 3,5-bis(1,1-dimethylethyl)-4-hydroxycinnamic acid was precipitated with HCl, and after filtration dried at 80° C. Recrystallization was performed from o-xylene and dioxane. 2,6-bis(1,1-dimethylethyl)-4-ethenylphenol was obtained by dissolving the 3,5-bis(1,1-dimethylethyl)-4-hydroxycinnamic acid in dimethylsulfoxide so that the concentration thereof in the dimethyl sulfoxide was 20%, and then thermally decomposing it by heating the solution for 30 minutes at 130° C. for complete decarboxylation.

The amount of 1-pentene incorporated into the copolymers, can be determined by carbon 13 nuclear magnetic resonance spectroscopy, by $^1$HNMR spectroscopy and by IR spectroscopy. However, more simply, in the Examples, the weight percentage of 1-pentene was determined from infrared spectrum at room temperature, using the 971 $cm^{-1}$ band for propylene and the 735 $cm^{-1}$ band for 1-pentene. The results correlate with those obtained by the integration area of methylene, methane and methyl by $^1$HNMR spectra of the copolymers in 1,2-dichlorobenzene.

The melt flow index was measured according to the standard test method for flow rates of thermoplastics by extrusion plastometer ASTM-D 1238-90B. The melt flow index (MFI) is expressed on the basis 230° C./2.16 kg.

The tensile properties were determined according to the standard test method for tensile properties of plastics, ASTMD 638M-91. (Specimen type MIII; crosshead speed 100 mm/min).

The impact strength was determined according to the standard test method for impact resistance of plastics and electrical insulating material, ASTM 256-92.

The haze was determined according to the standard test method for haze and luminous transmittance of transparent plastics ASTMD 1003-92.

The estimates of thermooxidation and long term heat stability were effected by ageing a film of the composition in question at 110° C. in an aerated oven. The estimation of thermooxidation was made by measuring by IR spectroscopy at 1720 $cm^{-1}$ the carbonyl peak of carbonyl which formed due to the oxidation of the copolymer. The lower the increase of the carbonyl formation, the higher is the thermooxidative stability. The results are expressed as % of the carbonyl increase in 365 days. The estimation of the long term heat stability was made by visual inspection during exposure for lack of any local embrittlement. The estimation of local embrittlement was according to DIN 53383/1975, chapter 2.3.

Thus, in Examples 1–5, the continuous variation in the ratio of the concentration of propylene to that of 1-pentene was achieved as a result of the monomers being consumed at unequal rates during the reaction; in addition, the propylene was added continuously over a period of time with the flow rate thereof into the reactor being kept constant so that the pressure increased continuously, while the 1-pentene was added only at the start of the reaction so that its concentration thus decreased as the reaction progressed. In Examples 6–10, the entire quantity of 1-pentene used was again added to the reactor at the start of the reaction so that its concentration decreased continuously as the reaction progressed, while the propylene was added continuously, with its flow rate being adjusted to maintain a predetermined pressure in the reactor so that the propylene partial pressure in the reactor increased continuously.

The copolymers obtained from the process according to the invention have a good balance between application properties on the physical mechanical and the optical sides. Analysis of the polymer, when related for each particular case to the application properties, show that the specificity of the comonomer and the non-uniformity or randomness of the copolymer structure are the principle factors influencing the effects obtained.

More specifically, the comonomer 1-pentene enhances certain properties of polypropylene polymers. This arises firstly from the specific length of 1-pentene. This specific length, combined with the composition, controls the crystallinity of the copolymers. Secondly, the copolymers obtained under a certain feed composition have a random distribution which is determined by the ratio of the reactivity between 1-propylene and 1-pentene. It is an important feature of this invention that the ratio of the concentration of 1-pentene to that of 1-propylene in the reaction system changes continuously, and the composition of the copolymer which is formed thus also changes continuously. This provides a unique tool for obtaining a large variety of propylene/1-pentene copolymers whose properties are controlled by the non-uniformity or randomness obtained according to each particular set of reaction conditions utilized, as is evident from the Examples.

According to this invention, a random propylene copolymer with 1-pentene having good melt flow and mould properties as well as good transparency is produced. Properties such as flexibility and impact strength, can be controlled easily. Films of low haze, ie good transparency, are suitable for packaging and, among others, pipes, coatings, injection and flow moulding articles can be produced.

The resultant random thermoplastic copolymers thus have crystalline and amorphous sequences. It has also been found that the copolymers have, as stated hereinbefore, a good balance between application properties. Thus, the copolymers retained good tensile strength at yield, have high impact strength and good optical properties, ie low haze.

The invention thus provides a propylene/1-pentene copolymer composition which is excellent as regards thermooxidative stability and long term heat stability.

The use of a monomeric phenolic stabilizer grafted onto the copolymer chain prevents or inhibits the loss of the antioxidant during processing as a result of volatility, migration or extraction with solvents.

The use of a mixture of an organic phenolic stabilizer with a monomeric phenolic stabilizer grafted onto the copolymer is an exceptional combination which brings about the best short and long term stabilization effects.

The use of an organic phosphite together with a phenolic antioxidant and especially with a mixture of an organic phenolic antioxidant and a monomeric phenolic antioxidant grafted onto the copolymer chain increases the stability of the propylene/1-pentene copolymer to thermooxidative degradation and is believed to be the optimum for long term heat stability.

What is claimed is:

1. A polymer composition, which comprises as component (i), a copolymer of propylene and 1-pentene which has a random arrangement of propylene and 1-pentene, is thermoplastic, has crystalline and amorphous sequences, and has a melt flow index in the range of about 0.01 to about 200 g/10 minutes;

as component (ii), an organic phenolic stabilizer having a molecular mass exceeding 300, a monomeric phenolic stabilizer or both; and at least one additional component selected from the following group of components (iii), (iv) and (v);

as component (iii), at least one organic phosphite stabilizer;

as component (iv), at least one thioether stabilizer; and as component (v), at least one metal salt of a higher aliphatic acid.

2. A polymer composition according to claim 1, wherein component (ii) comprises the monomeric phenolic stabilizer grafted onto the copolymer of propylene and 1-pentene, and, optionally, the organic phenolic stabilizer having the molecular mass exceeding 300.

3. A polymer composition according to claim 1, wherein component (iii) is present, with the organic phosphite stabilizer having a molecular mass in excess of 300.

4. A polymer composition according to claim 1 inclusive, wherein component (iv) is present, with the thioether stabilizer being selected from the group consisting in dilauryl thiodipropionate, distearyl thiodipropionate, dimyristyl thiodipropionate, and dioctadecyl disulphide.

5. A polymer composition according to claim 1 inclusive, wherein component (v) is present, with the metal salt being an alkaline earth metal salt, an alkali metal salt, a zinc salt, a cadmium salt, or a lead salt of stearic acid, lauric acid, capric acid or palmitic acid.

6. A polymer composition according to claim 1, which comprises

| | |
|---|---|
| component (i) | about 100 parts by mass |
| component (ii) | 0.01–1 part by mass |
| component (v) | 0.01–3 parts by mass |

7. A polymer composition according to claim 1, which comprises

| | |
|---|---|
| component (i) | about 100 parts by mass |
| component (ii) | 0.01–1 part by mass |
| component (iii) | 0.01–1 part by mass |
| component (v) | 0.01–3 parts by mass |

8. A polymer composition according to claim 1, which comprises

| | |
|---|---|
| component (i) | about 100 parts by mass |
| component (ii) | 0.01–1 part by mass |
| component (iv) | 0.01–3 parts by mass |
| component (v) | 0.01–3 parts by mass |

* * * * *